US011976607B2

(12) United States Patent
Liu et al.

(10) Patent No.: US 11,976,607 B2
(45) Date of Patent: May 7, 2024

(54) ENGINE AND VEHICLE

(71) Applicant: BYD COMPANY LIMITED, Guangdong (CN)

(72) Inventors: Mingliang Liu, Shenzhen (CN); Nan Zhang, Shenzhen (CN); Shiyi Pan, Shenzhen (CN); Shengjie Hao, Shenzhen (CN); Bingbing Yuan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/214,444

(22) Filed: Jun. 26, 2023

(65) Prior Publication Data

US 2023/0340923 A1 Oct. 26, 2023

Related U.S. Application Data

(63) Continuation of application No. PCT/CN2022/072821, filed on Jan. 19, 2022.

(30) Foreign Application Priority Data

Mar. 1, 2021 (CN) ......................... 202110227871.7

(51) Int. Cl.
*F02F 1/16* (2006.01)
*F02F 1/14* (2006.01)

(52) U.S. Cl.
CPC . *F02F 1/16* (2013.01); *F02F 1/14* (2013.01)

(58) Field of Classification Search
CPC ...................................... F02F 1/14; F02F 1/16
USPC ........................................ 123/41.72, 41.82 R
See application file for complete search history.

(56) References Cited

U.S. PATENT DOCUMENTS 7,367,294 B2 * 5/2008 Rozario ................ F02F 1/4264 123/193.5
10,267,208 B2 * 4/2019 Kudo ...................... F02F 1/243
2010/0224144 A1 * 9/2010 Lopez-Crevillen ....... F02F 1/40 123/41.82 R
2010/0242869 A1 * 9/2010 Knollmayr ................ F02F 1/40 123/41.82 R
2012/0227686 A1 * 9/2012 D'Anna .................. F02F 1/243 123/41.82 R (Continued)

FOREIGN PATENT DOCUMENTS

CN 108894888 A 11/2018
CN 110284990 A 9/2019

(Continued)

OTHER PUBLICATIONS

International Search Report and Written Opinion for Application No. PCT/CN2022/072821, dated Apr. 22, 2022, 9 pages.

*Primary Examiner* — Hai H Huynh

(57) ABSTRACT

An engine includes a cylinder head and a cylinder block. The cylinder head has a first water jacket passage, an exhaust passage and a second water jacket passage. The exhaust passage is located between the first water jacket passage and the second water jacket passage. The first water jacket passage and the second water jacket passage are disposed close to the exhaust passage. The first water jacket passage is in communication with the second water jacket passage. The second water jacket passage is in communication with the cylinder block. The second water jacket passage has a water inlet passage.

18 Claims, 4 Drawing Sheets

(56) References Cited

U.S. PATENT DOCUMENTS

| | | | | |
|---|---|---|---|---|
| 2012/0312257 | A1* | 12/2012 | Beyer | F02F 1/40 123/41.82 R |
| 2013/0055971 | A1* | 3/2013 | Brewer | F01P 3/12 123/41.82 R |
| 2016/0195000 | A1 | 7/2016 | Nakashima | |

FOREIGN PATENT DOCUMENTS

| | | | |
|---|---|---|---|
| CN | 210977700 | U | 7/2020 |
| CN | 111852683 | A | 10/2020 |
| DE | 102014012503 | A1 | 2/2016 |
| EP | 2500558 | A1 | 9/2012 |
| JP | 2003138938 | A | 5/2003 |
| JP | 2005256648 | A | 9/2005 |

* cited by examiner

ENGINE AND VEHICLE

CROSS-REFERENCE TO RELATED APPLICATION

This application is a Continuation Application of International Patent Application No. PCT/CN2022/072821, filed on Jan. 19, 2022, which is based on and claims priority to and benefits of Chinese Patent Application No. 202110227871.7, entitled "ENGINE AND VEHICLE" and filed on Mar. 1, 2021. The entire content of all of the above-referenced applications is incorporated herein by reference.

FIELD

The present disclosure relates to the technical field of engines, and more particularly, to an engine and a vehicle.

BACKGROUND

Coolant flows in an engine to lower the temperature of the engine and cool the engine. However, the cooling effect for the cylinder head is undesirable. The highest temperature in the key areas of the cylinder head, such as the bridge zone, may be too high, resulting in problems such as the thermal surface materials deteriorates, which causes unbalanced cooling effect for various parts in the engine, leading to local overheating of the engine. Also, the temperature of the lower part of the cylinder is low, and most of the flow passing through the lower part of the cylinder fails to absorb enough heat to bring down the temperature, which may also lead to overcooling of the lower part of the cylinder. Besides, the temperature between adjacent cylinders is high, which tends to cause fatigue and makes the engine unable to operate normally. Some engines adopt the configuration where the cylinder head and the exhaust manifold are independent of each other. The exhaust manifold is not cooled by the coolant, and the exhaust gas has a high temperature, causing thermal fatigue of the parts and making the engine unable to operate normally, which is undesirable for the application to high-power engines. Also, as the cylinder head and the exhaust manifold are made of separate parts, the weight is increased and fuel consumption is increased.

SUMMARY

The present disclosure provides an engine and a vehicle that at least solve the problem of undesirable cooling effect for the cylinder head of the engine.

According to a first aspect of the present disclosure, an engine is provided. The engine includes a cylinder head and a cylinder block. The cylinder head has a first water jacket passage, an exhaust passage and a second water jacket passage. The exhaust passage is located between the first water jacket passage and the second water jacket passage. The first water jacket passage and the second water jacket passage are disposed close to the exhaust passage. The first water jacket passage is in communication with the second water jacket passage. The second water jacket passage is configured to be in communication with the cylinder block. The second water jacket passage has a water inlet passage.

In an embodiment, the first water jacket passage has a first water outlet passage located on a first side of the first water jacket passage away from the water inlet passage. The cylinder block has a second water outlet passage disposed away from the water inlet passage. The coolant is divided after passing through the water inlet passage and flows out of the first water outlet passage and the second water outlet passage.

In an embodiment, the second water jacket passage is in communication with the first water jacket passage via multiple first passages. The multiple first passages are distributed along the arrangement direction of the cylinder barrels inside the cylinder block and close to the cylinder barrels.

The water inlet passage is located on a first side of the second water jacket passage that is opposite to a second side of the second water jacket passage in communication with the multiple first passages and the extension direction of the water inlet passage is the same as the arrangement direction of the cylinder barrels.

In an embodiment, the second water jacket passage includes a second water jacket primary zone, bridge zones, and a second water jacket secondary zone. The second water jacket primary zone and the second water jacket secondary zone are in communication via the bridge zones. The second water jacket secondary zone is located on a circumference of a spark plug.

The multiple first passages are in communication with a portion of the second water jacket passage close to the bridge zones.

In an embodiment, the cylinder head further includes a first guiding rib set and a second guiding rib set located within the second water jacket primary zone.

At least a part of the first guiding rib set is located at a first position in the second water jacket primary zone, and the first position corresponds to a region between two adjacent bridge zones.

The second guiding rib set is located at a second position in the second water jacket primary zone, and the second position corresponds to the bridge zones and is close to the bridge zones.

In an embodiment, the cylinder head further includes a third guiding rib set located in the first water jacket passage. The third guiding rib set causes a branch of the first water jacket passage to correspond to the exhaust passage, and the branch is disposed close to the exhaust passage.

In an embodiment, the cylinder block has a third water jacket passage surrounding outer walls of the cylinder barrels in the cylinder block. The second water jacket passage is in communication with the third water jacket passage.

In an embodiment, the second water jacket passage is in communication with the third water jacket passage via at least one second passage. The second passage is disposed close to the water inlet passage.

In an embodiment, a gap is formed between the cylinder block and the cylinder barrels. The third water jacket passage is located in the gap.

The third water jacket passage on a first side close to the combustion chamber in the cylinder barrels is a first thickness, and the third water jacket passage on a second side away from the combustion chamber in the cylinder barrels is a second thickness. The first thickness is greater than the second thickness.

In an embodiment, the engine includes an insert inserted in the gap between the cylinder block and the cylinder barrel. The third water jacket passage is disposed between the insert and the cylinder barrels. The distance between the outer wall of a first portion of the cylinder barrels close to the combustion chamber and the insert is a first distance, and the distance between the outer wall of a second portion of the cylinder barrels away from the combustion chamber and the insert is a second distance. The first distance is greater than the second distance.

In an embodiment, the third water jacket passage further includes a third passage located between the adjacent cylinder barrels. The third passage is of a bent shape.

According to a second aspect of the present disclosure, a vehicle including the engine described above is provided.

In the present disclosure, an exhaust passage is provided on the cylinder head of the engine, a first water jacket passage and a second water jacket passage are provided on two sides of the exhaust passage, and the first water jacket passage and the second water jacket passage can absorb the heat of the high-temperature gas in the exhaust passage and the thermal surface of the cylinder head, thereby effectively lowering the temperature of the cylinder head and providing the desirable cooling effect for the cylinder head.

Other features and advantages of the present disclosure will become apparent from the following detailed description of the embodiments of the present disclosure with reference to the drawings.

BRIEF DESCRIPTION OF THE DRAWINGS

Accompanying drawings, which are incorporated into and constitute a part of this specification, show embodiments of the present disclosure, and are used together with description thereof to explain the principle of the present disclosure.

DESCRIPTION OF REFERENCE NUMERALS

Figure 1:
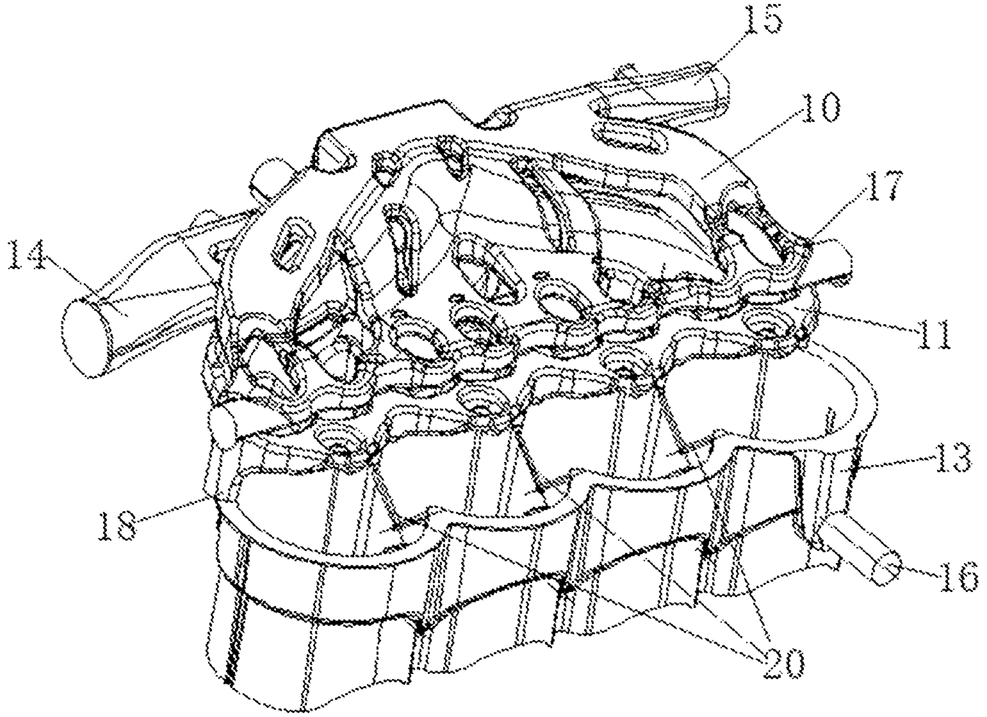
FIG. 1 is a schematic structural view of the overall structure of a water jacket passage viewed from a first perspective.

10: first water jacket passage; 11: second water jacket passage; 111: second water jacket primary zone; 112: bridge zone; 113: second water jacket secondary zone; 12: cylinder block; 121: cylinder barrel; 13: third water jacket passage; 14: water inlet passage; 15: first water outlet passage; 16: second water outlet passage; 17: first passage; 18: second passage; 19: insert; 20: third passage; 21: first guiding rib set; 211: first guiding rib; 212: second guiding rib; 213: third guiding rib; 214: fourth guiding rib; 215: fifth guiding rib; 216: sixth guiding rib; 22: second guiding rib set; 23: third guiding rib set; 231: eleventh guiding rib; 232: twelfth guiding rib; 233: thirteenth guiding rib; 234: fourteenth guiding rib; 235: fifteenth guiding rib; 236: sixteenth guiding rib; and 237: seventeenth guiding rib.

DETAILED DESCRIPTION

Various embodiments of the present disclosure are now to be described in detail with reference to the accompanying drawings. It is to be noted that, unless otherwise specified, relative arrangement, numerical expressions, and numerical values of components and steps described in these embodiments shall not limit the scope of the present disclosure.

The following description of embodiments is merely illustrative, and does not limit the present disclosure and application or use of the present disclosure.

Some of the techniques, methods, and devices may not be discussed in detail, but where appropriate, those techniques, methods, and devices should be considered as a part of the specification.

In all examples shown and discussed herein, the values should be merely examples but not limitation. Therefore, other examples of embodiments may have different values.

It is to be noted that, similar items are denoted by similar numbers and letters in the accompanying drawings below, and therefore, once an item is defined in one accompanying drawing, the item does not need to be further discussed in the subsequent accompanying drawings.

An engine according to an embodiment of the present disclosure will first be described in detail below with reference to FIG. 1 to FIG. 8.

According to a first aspect of the present disclosure, an engine is provided. The engine includes a cylinder head. The cylinder head has a first water jacket passage 10, an exhaust passage, and a second water jacket passage 11 inside arranged/disposed in sequence from top to bottom. That is, the exhaust passage is located between the first water jacket passage 10 and the second water jacket passage 11. The first water jacket passage 10 and the second water jacket passage 11 are arranged close to the exhaust passage. The first water jacket passage 10 is in communication with the second water jacket passage 11. That is, the first water jacket passage 10, the exhaust passage, and the second water jacket passage 11 are adjacent to each other and arranged in sequence in the direction from the upper surface of the cylinder head to the cylinder block 12, so that the coolant is closer to the exhaust passage when the coolant circulates in the first water jacket passage 10 and the second water jacket passage 11. Therefore, quick heat exchange is enabled between the high-temperature gas flowing in the exhaust pipe and the coolant, so that the temperature of the high-temperature gas flowing in the exhaust passage can be effectively lowered. Also, the first water jacket passage 10 and the second water jacket passage 11 are located inside the cylinder head at the upper and lower ends thereof respectively. As such, the coolant can be distributed over most of the region of the cylinder head, thereby effectively lowering the temperature of the cylinder head. The second water jacket passage 11 is configured to be in communication with the cylinder block 12, so that the coolant can continue to flow to the cylinder block 12 after cooling the cylinder head to cool the cylinder block 12. The second water jacket passage 11 has a water inlet passage 14. That is, the coolant first enters the second water jacket passage 11 on the cylinder head. The coolant that first enters the circulation has the lowest temperature in the whole coolant circulation system, which facilitates achieving the desirable cooling effect for the cylinder head.

In an embodiment of the present disclosure, the exhaust passage is configured to discharge the gas generated by the engine. In related art, a separate exhaust manifold connected to the engine is arranged on the engine to discharge the gas generated by the engine. In the present disclosure, the separate exhaust manifold is integrated to the cylinder head to form the exhaust passage. As such, the engine is integrated to a greater extent and a separate manifold is eliminated, so that the overall weight of the engine is reduced and fuel consumption is saved. The cylinder block 12 has an opening. The cylinder head is fitted over the cylinder block 12 to cover the opening on the cylinder block 12, and the cylinder head is secured to the cylinder block 12, so as to form the overall contour of the engine. A cylinder gasket is disposed between the cylinder head and the cylinder block 12 to prevent leakage of the liquid in the engine and the liquid flowing between the cylinder head and the cylinder block 12, thereby ensuring sealing between the cylinder head and the cylinder block 12.

In an embodiment of the present disclosure, the first water jacket passage 10 and the second water jacket passage 11 may be irregular cavities that mate the cylinder head. Coolant circulates in the cavities to lower the temperature of the engine, and the coolant may be a flowable material such as water, glycol, and the like.

In the present disclosure, an exhaust passage is disposed on the cylinder head of the engine, and a first water jacket passage 10 and a second water jacket passage 11 are disposed on the upper side and lower side of the exhaust passage. The first water jacket passage 10 and the second water jacket passage 11 can absorb the heat of the high-temperature gas in the exhaust passage and the thermal surface of the cylinder head, thereby effectively lowering the temperature of the cylinder head and providing desirable cooling effect for the cylinder head.

Meanwhile, as the exhaust passage is located in the cylinder head and two sides of the exhaust passage are provided with the first water jacket passage 10 and the second water jacket passage 11 where the coolant circulates, the temperature of the gas flowing in the exhaust passage can be lowered and the temperature of the gas discharged from the engine can be lowered, thereby preventing the problem that elevated temperature of the discharged gas causes thermal fatigue of the parts and prevents the engine from normal operation. Further, with the exhaust manifold in related art, the gas from multiple branches is gathered to the same pipe for discharge, and the gathered high-temperature gas has a volume too large to be cooled down. In view of this, in the present disclosure, the gas from multiple branches is gathered in different pipes for discharge. For example, a four-cylinder engine has four corresponding branch passages that are converged two by two to form two pipes for discharge, which can increase the area for heat exchange between the high-temperature gas and the coolant and effectively lower the temperature of the high-temperature gas generated by the engine.

In an embodiment of the present disclosure, a warm air and exhaust gas recirculation (EGR) exit is further provided on the portion of the second water jacket passage 11 close to the water inlet passage 14, so that warm air can be obtained quickly and EGR can be cooled, thereby ensuring normal operation of the EGR. Meanwhile, an exhaust exit is provided on the portion of the first water jacket passage 10 close to the first water outlet passage 15. The exhaust exit is configured to discharge the gas in the first water jacket passage 10 so as to prevent the case where bubbles gather to cause the heat exchange coefficient to be decreased so that heat cannot be discharged, causing the phenomenon of overheated local regions.

In an embodiment, the first water jacket passage 10 has a first water outlet passage 15 located on the side of the first water jacket passage 10 away from the water inlet passage 14, so that the course over which the coolant flows is long, thus the heat exchange area is increased and the heat exchange capacity is improved. The cylinder block 12 has a second water outlet passage 16 away from the water inlet passage 14. The coolant is divided after passing through the water inlet passage 14 and flows out of the first water outlet passage 15 and the second water outlet passage 16, so that the course over which the coolant flows is extended and the cooling efficiency is improved. As can be appreciated from the solution described above, the coolant enters the second water jacket passage 11 through the water inlet passage 14, and then is divided in the second cooling passage. The divided coolants enter the first water jacket passage 10 and the cylinder block 12 respectively, and are discharged from the engine through the first water outlet passage 15 and the second water outlet passage 16 respectively, so as to accomplish the heat transfer and cooling of the engine.

In an embodiment, the second water jacket passage 11 is in communication with the first water jacket passage 10 via multiple first passages 17, so that the coolant can enter the first water jacket passage 10 in the multiple first passages 17 from the second water jacket passage 11, thereby increasing the circulation area of the coolant and increasing the flow rate of the coolant and enabling the effective heat transfer. The multiple first passages 17 are distributed along the arrangement direction of the cylinder barrels 121 in the cylinder block 12 and close to the cylinder barrels 121, so that the coolant in the second water jacket passage 11 can enter the first water jacket passage 10 uniformly, and the flow distribution of the coolant flowing through each first passage 17 is as reasonable as possible, in order to ensure equalized cooling of the exhaust passage.

The water inlet passage 14 is located on the side of the second water jacket passage 11 opposite to the side in communication with the first passage 17, so that a largest possible span is provided between the water inlet passage 14 and the communicating position of the first passage 17 in order to ensure that the coolant circulates completely in the second water jacket passage 11 to ensure the heat exchange capacity. Furthermore, the extension direction of the water inlet passage 14 is the same as the arrangement direction of the cylinder barrels 121, so that the coolant can flow along the arrangement direction of the cylinder barrels 121, and so that the coolant that flows into the water inlet passage 14 flows uniformly to the first passage 17, thereby ensuring to the greatest possible extent that various parts of the coolant have the same degree of heat absorption and ensuring equalized cooling of the engine.

In an embodiment, the second water jacket passage 11 includes a second water jacket primary zone 111, at least two bridge zones 112 and a second water jacket secondary zone 113. The second water jacket primary zone 111 is in communication with the second water jacket secondary zone 113 via the bridge zones 112. The second water jacket secondary zone 113 is located at a circumferential side of the spark plug. The second water jacket primary zone 111 mainly serves to lower the temperature of the cylinder head and the exhaust passage. The second water jacket primary zone 111 is the main part of the second water jacket passage 11. The bridge zones 112 have a small width and mainly serve to lower the temperature of and cool the thermal surface of the cylinder head. The bridge zones 112 are provided to be narrow, so that the flow rate of the coolant can be increased, the efficiency of heat exchange between the coolant and the thermal surface of the cylinder head can be improved and the temperature of the thermal surface portions of the cylinder head can effectively lowered. The second water jacket secondary zone 113 mainly serves to lower the temperature of the spark plug. The second water jacket passage 11 in the present disclosure has a reasonable structure and layout and can lower the temperature of various parts of the cylinder head at the same time, facilitating equalized cooling of various parts of the engine.

The first passage 17 is in communication with the portion of the second water jacket passage 11 close to the bridge zones 112. As the portion of the bridge zones 112 is narrow, the parameters such as the flow speed or the like of the coolant passing through the bridge zone 112 will change. This change is unfavorable for flowing of the coolant in the second water jacket passage 11 to the first water jacket passage 10 through the first passage 17. By keeping the position at which the first passage 17 is in communication with the second water jacket passage 11 away from the bridge zones 112, the problem mentioned above can be avoided, which is favorable for flowing of the coolant to the first water jacket passage 10. Meanwhile, the position at which the first passage 17 is in communication with the second water jacket passage 11 is close to the bridge zones 112, and the positions of the bridge zones 112 are distant from the position of the water inlet passage 14. That is, the range in which the coolant can flow in the second water jacket passage 11 is large, thereby ensuring sufficient heat exchange of the coolant and effective temperature lowering and cooling of the cylinder head.

In an embodiment, the cylinder head further includes a first guiding rib set 21 and a second guiding rib set 22. The first guiding rib set 21 and the second guiding rib set 22 are located in the second water jacket primary zone 111. The first guiding rib set 21 and the second guiding rib set 22 are mainly to guide the coolant in the second water jacket primary zone 111 to achieve uniform distribution of the coolant to the greatest extent.

Figure 5:
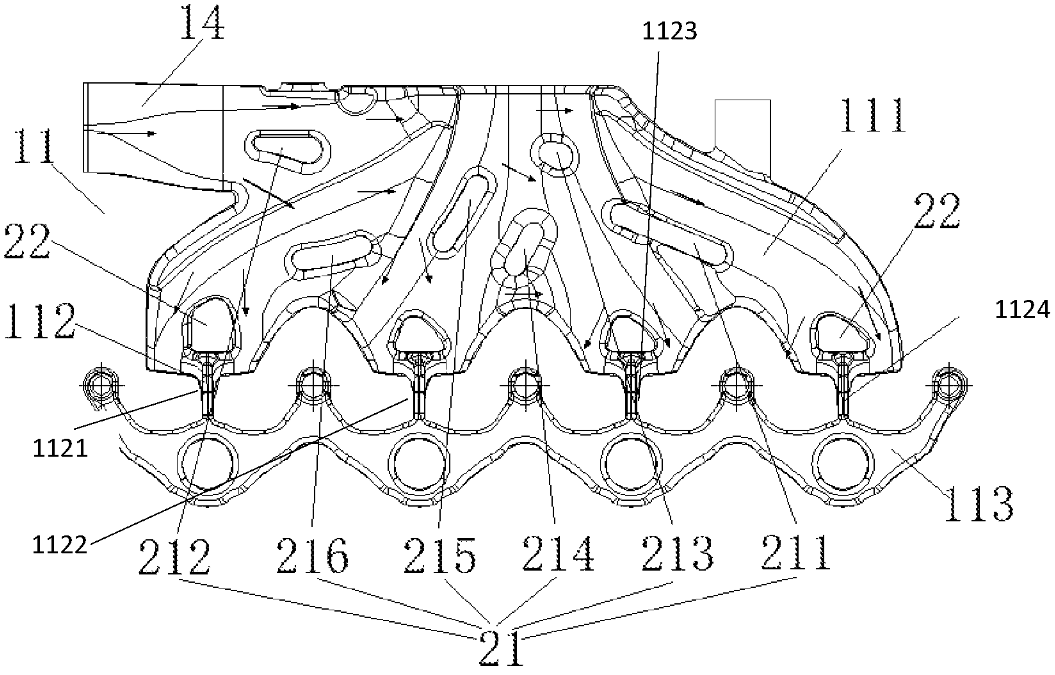
FIG. 5 is a schematic structural view of a second water jacket passage.

Further, as shown in FIG. 5, at least a part of the first guiding rib set 21 is located at a first position in the second water jacket primary zone 111. The first position is opposite to the region between the two adjacent bridge zones 112. Taking a first guiding rib 211 in the first guiding rib set 21 as an example, the first guiding rib 211 is disposed in the second water jacket primary zone 111. The position of the first guiding rib 211 corresponds to the portion between the two adjacent bridge zones 112. The first guiding rib 211 serves to divide the coolant, so that the divided coolants flow respectively into the vicinity of the bridge zones 112 at both sides of the first guiding rib 211, thereby achieving the function of guiding to cause the coolant to enter the above bridge zones 112 with the uniform flow distribution.

In an embodiment of the present disclosure, as shown in FIG. 5, the first guiding rib set 21 further includes a second guiding rib 212 arranged/disposed close to the water inlet passage 14 to provide a first division of the coolant flowing into the water inlet passage 14. Meanwhile, the first guiding rib set 21 further includes a third guiding rib 213 arranged/disposed close to the second guiding rib 212. The third guiding rib 213 provides a second division of the coolant after the first division of the coolant, so as to achieve the rough flow distribution of the coolant in the second water jacket primary zone 111, thereby facilitating achieving equalized cooling of the engine. Further, the various guiding ribs in the first guiding rib set 21 all extend along the substantial flowing direction of the coolant to present an inclined state that is substantially the same as the flowing direction of water.

In an embodiment, as shown in FIG. 5, the first guiding rib set 21 in the present disclosure has six guiding ribs and four bridge zones 112. The second guiding rib 212 is located on a portion of the second water jacket passage 11 close to the water inlet passage 14. The second guiding rib 212 has a length in a direction that is substantially along the flowing direction of the coolant, and a width of the second guiding rib 212 is incremented along the direction away from the water inlet passage 14, so that a part of the coolant flows to the right and a part of the coolant flows to the lower right, thereby achieving rough distribution of the flow of the coolant. A fifth guiding rib 215 is located at a position that is lower right to the second guiding rib 212. The fifth guiding rib 215 is of a long stick shaped structure. The lower side of the fifth guiding rib 215 is inclined to the left. The fifth guiding rib 215 can prevent most of the coolant from flowing to the right. A part of the coolant flows to the bridge zone 112 that is lower left to the fifth guiding rib 215 by blocking and guiding of the coolant, thereby achieving the second division of the coolant. A sixth guiding rib 216 is located at a position that is lower right to the second guiding rib 212. The sixth guiding rib 216 is of a long stick shape. The sixth guiding rib 216 is located between the first bridge zone 1121 and the second bridge zone 1122. The first bridge zone 1121 is located directly below the water inlet passage 14. The second bridge zone 1122 is located right to the first bridge zone 1121 and is adjacent to the first bridge zone 1121. The sixth guiding rib 216 is inclined downward left, one end of the sixth guiding rib 216 is toward the first bridge zone 1121, and the other end of the sixth guiding rib 216 is toward the fifth guiding rib 215. The sixth guiding rib 216 restricts the flow of the incoming coolant that flows into the first bridge zone 1121 and causes a part of the coolant to flow to the right. The third guiding rib 213 is arranged/disposed away from the water inlet passage 14 in the extension direction of the water inlet passage 14. The third guiding rib 213, which is of an elliptical shape, divides the coolant for the third time, making the flow distribution of the coolant more reasonable. A third bridge zone 1123 is arranged/disposed adjacent to the second bridge zone 1122, right to the second bridge zone 1122. The fourth guiding rib 214 is arranged between the second bridge zone 1122 and the third bridge zone 1123. The fourth guiding rib 214 is of a long stick shape. The fourth guiding rib 214 is inclined downward left, one end of the fourth guiding rib 214 is toward the second bridge zone 1122, and the other end of the fourth guiding rib 214 is toward the third guiding rib 213. The fourth guiding rib 214 can properly distribute the flow of the coolant flowing to the second bridge zone 1122 and to the third bridge zone 1123. A fourth bridge zone 1124 is arranged/disposed adjacent to the third bridge zone 1123, right to the third bridge zone 1123. The first guiding rib 211 is arranged/disposed between the third bridge zone 1123 and the fourth bridge zone 1124. The first guiding rib 211 is of a long stick shape. One end of the first guiding rib 211 is toward the fourth bridge zone 1124 and the other end of the first guiding rib 211 is toward the third guiding rib 213. The first guiding rib 211 can properly distribute the flow of the coolant flowing to the third bridge zone 1123 and to the fourth bridge zone 1124.

As shown in FIG. 5, the second guiding rib set 22 is located at second positions in the second water jacket primary zone 111 that correspond to the bridge zones 112 and close to the bridge zones 112, so that the guiding ribs of the second guiding rib set 22 can properly distribute the two (left and right) flows flowing into the bridge zones 112, thereby increasing the speed at which the coolant inflows into the bridge zones 112 and effectively cooling the thermal surface.

In an embodiment, as shown in FIG. 5, the second guiding rib set 22 in the present disclosure includes four guiding ribs. Each of the guiding ribs in the second guiding rib set corresponds to one of the bridge zones 112. The guiding ribs in the second guiding rib set 22 have a triangle-like shape. The first side of the above triangle-like shaped guiding ribs corresponds to the bridge zone 112, and the angle of the triangle-like shape opposite to the first side is toward the direction away from the bridge zone 112, thereby further ensuring that the second guiding rib set 22 can properly distribute the two (left and right) flows that flow into the bridge zones 112, increasing the speed at which the coolant inflows into the bridge zones 112, and effectively cooling the corresponding portion of the cylinder head.

In an embodiment, the cylinder head further includes a third guiding rib set 23 located in the first water jacket passage 10. The third guiding rib set 23 divides the first water jacket passage 10 into branches corresponding to the exhaust passage and close to the exhaust passage. That is, the various guiding ribs in the third guiding rib set 23 guide the coolant flowing in the first water jacket passage 10 and guide the coolant into multiple main liquid flows. The multiple liquid flows that are guided out correspond to the exhaust passage in the cylinder head. For example, the flowing path of the first liquid flow matches the path of the first exhaust duct in the exhaust passage, so that while the cylinder head is being cooled by the coolant in the first water jacket passage 10, the high-temperature gas in the exhaust passage can be accurately cooled.

Figure 6:
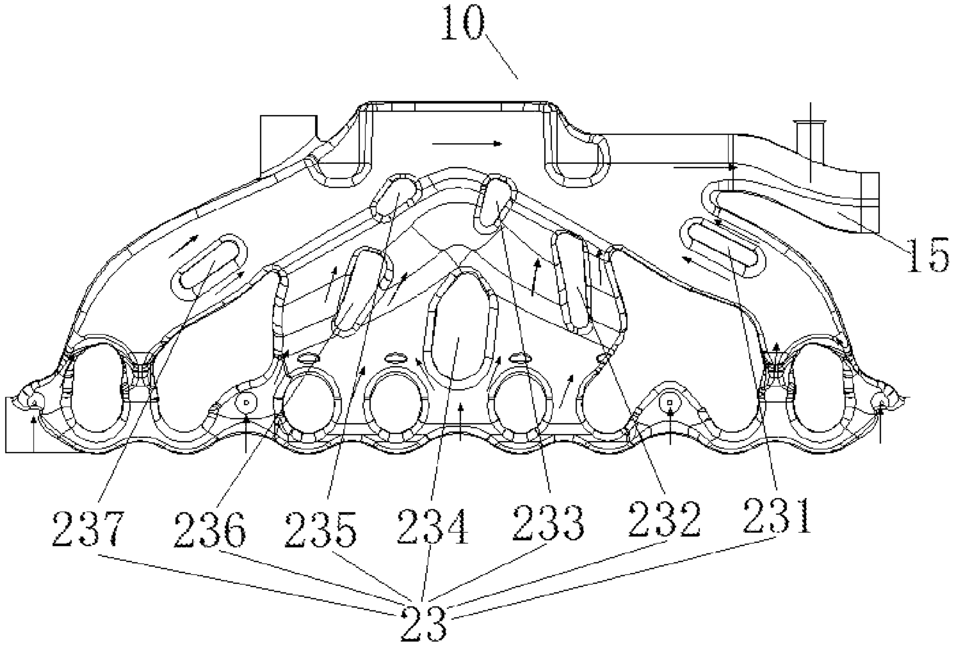
FIG. 6 is a schematic structural view of a first water jacket passage.
Figure 7:
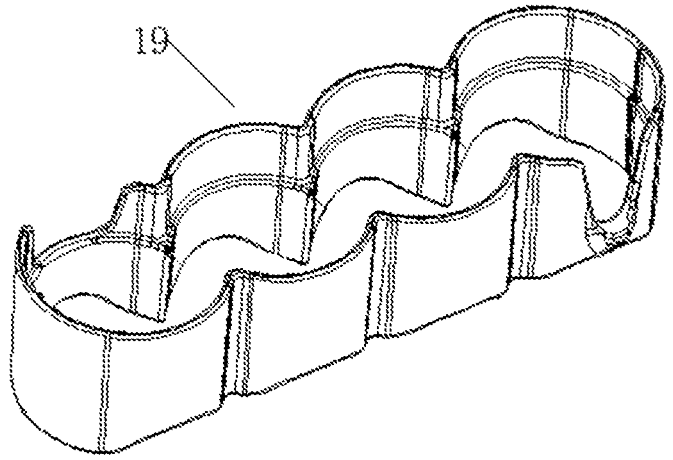
FIG. 7 is a schematic structural view of an insert.
Figure 8:
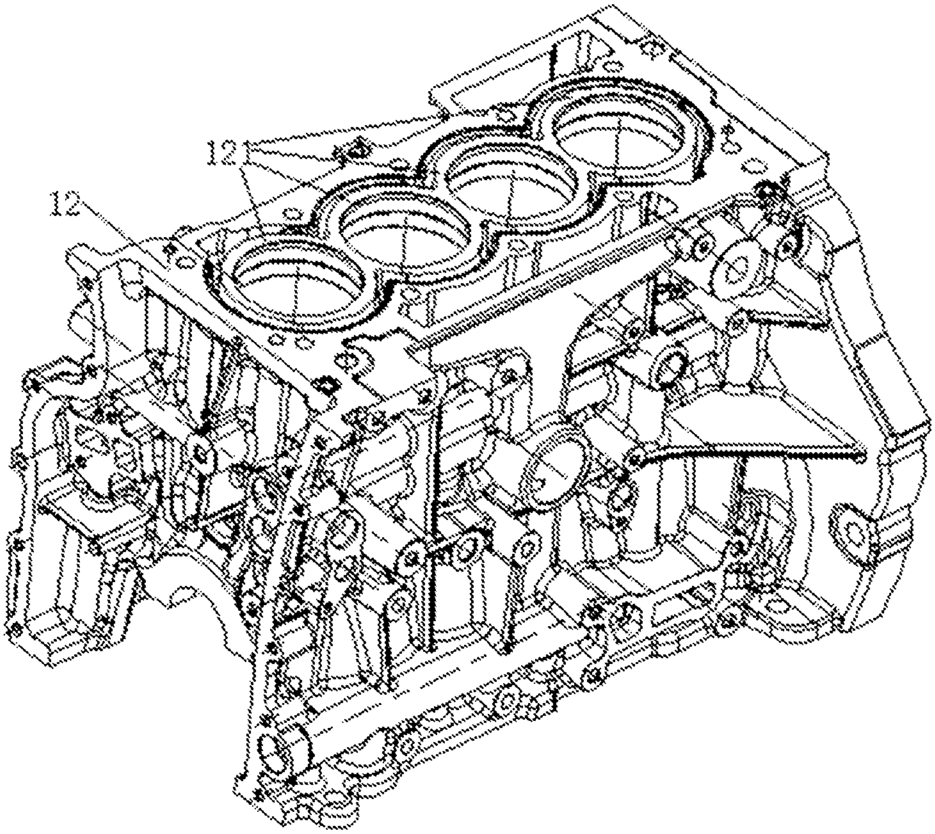
FIG. 8 is a schematic structural view of a cylinder block and an insert that are assembled.

In an embodiment, as shown in FIG. 6, the water inlet side of the first water jacket passage 10 in the present disclosure is at the lower side of the first water jacket passage 10. The coolant flows from the lower side of the first water jacket passage 10 toward the water outlet at the upper side of the first water jacket passage 10. A fourteenth guiding rib 234 is disposed in the middle of the first water jacket passage 10. The fourteenth guiding rib 234 is of a thick stick shape. The fourteenth guiding rib 234 is slightly inclined to the upper right, so that the coolant can be divided and directed toward both sides of the fourteenth guiding rib 234 to cool the corresponding exhaust passage on both sides of the fourteenth guiding rib 234. A sixteenth guiding rib 236, a fifteenth guiding rib 235, a thirteenth guiding rib 233, and a twelfth guiding rib 232 are distributed in sequence from left to right in a half ring shape along the upper end of the fourteenth guiding rib 234. The sixteenth guiding rib 236, the fifteenth guiding rib 235, the thirteenth guiding rib 233, and the twelfth guiding rib 232 are all of a long stick shape. Among them, the sixteenth guiding rib 236 and the twelfth guiding rib 232 have a length extending along the flowing direction of the coolant for reasonable distribution of the water flow, so that the distributed water flow can correspond to the exhaust passage. The fifteenth guiding rib 235 and the thirteenth guiding rib 233 mainly serve to block the coolant from flowing to the left so as ensure that the coolant can flow smoothly to the first water outlet passage 15. The seventeenth guiding rib 237 and the eleventh guiding rib 231 are respectively located on two (left and right) sides of the first water jacket passage 10 and serve to divide the coolant so that the coolant can cool the corresponding exhaust passage.

In an embodiment, the cylinder block 12 has a third water jacket passage 13 inside surrounding an outer wall of the cylinder barrels 121 in the cylinder block 12. The second water jacket passage 11 is in communication with the third water jacket passage 13.

The cylinder block 12 has one or more cylinder barrel 121 and a third water jacket passage 13 inside. The cylinder barrel 121 has a combustion chamber inside. The combustion chamber of the cylinder barrel 121 is the main source of the heat of the engine. The third water jacket passage 13 surrounds the outer wall of the cylinder barrel 121. When the coolant flows in the third water jacket passage 13, heat exchange can occur between the coolant and the outer wall of the cylinder barrel 121, and the heat is brought out of the engine by the coolant. As such, the heat source is cooled from the origin, thereby effectively accomplishing cooling of the engine. The second water jacket passage 11 is located between the first water jacket passage 10 and the third water jacket passage 13. The second water jacket passage 11 is in communication with the third water jacket passage 13.

In an embodiment, the second water jacket passage 11 is in communication with the third water jacket passage 13 via at least one second passage 18. The second passage 18 is arranged/disposed close to the water inlet passage 14, so that the coolant can enter the third water jacket passage 13 after flowing sufficiently in the second water jacket, thereby avoiding the case where the coolant enters the third water jacket passage 13 after flowing out, before flowing sufficiently in the second water jacket passage 11. The second water outlet passage 16 is located on the side of the third water jacket passage 13 away from the water inlet passage 14.

Figure 2:
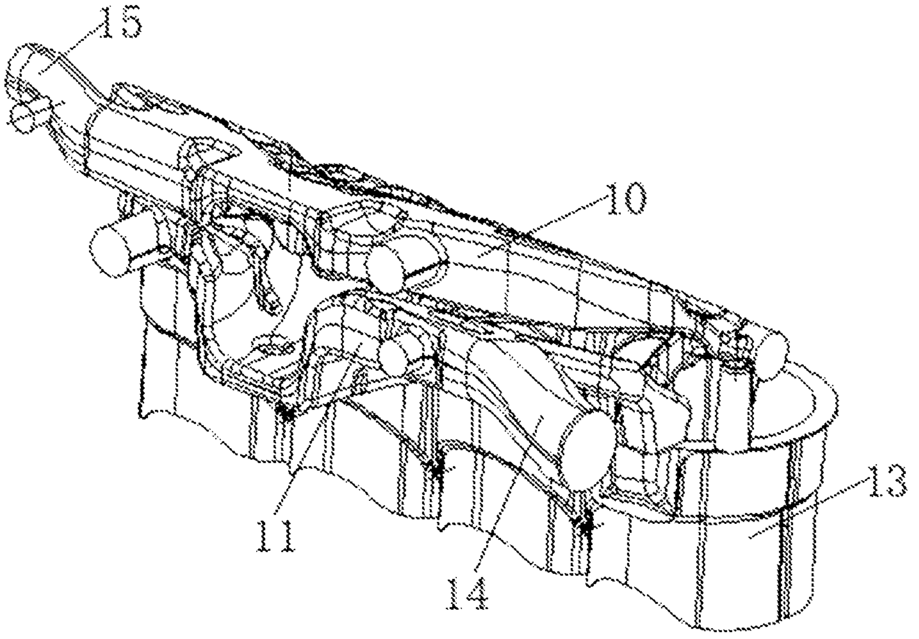
FIG. 2 is a schematic structural view of the overall structure of a water jacket passage viewed from a second perspective.
Figure 3:
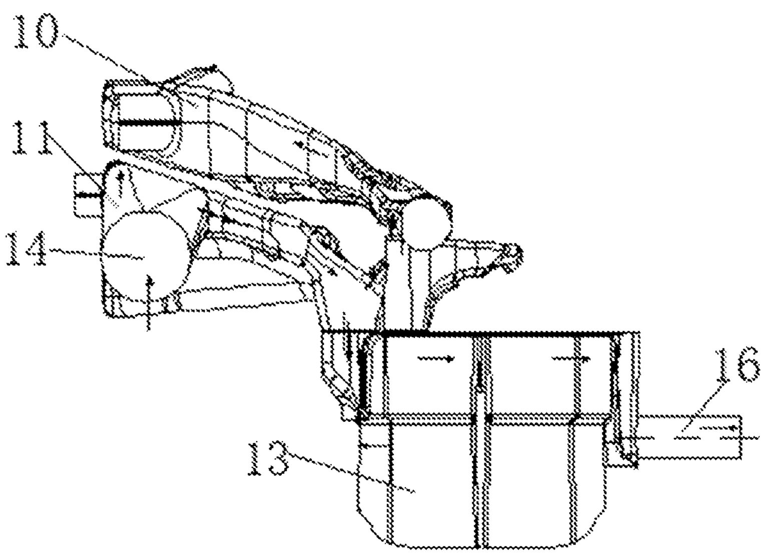
FIG. 3 is a left view of the overall structure of a water jacket passage.
Figure 4:
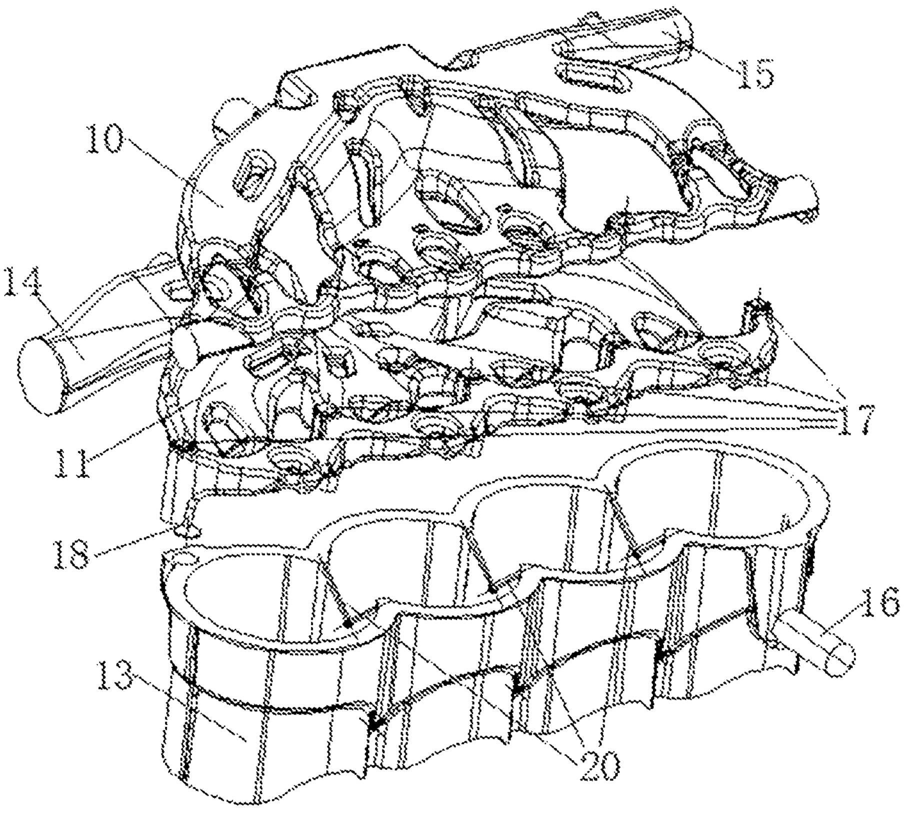
FIG. 4 is an exploded view of the overall structure of a water jacket passage.

In an embodiment, a gap is present between the cylinder block 12 and the cylinder barrel 121, and the third water jacket passage 13 is located in the gap. The thickness of the third water jacket passage 13 on the side close to the combustion chamber in the cylinder barrel 121 is a first thickness, and the thickness of the third water jacket passage 13 on the side away from the combustion chamber in the cylinder barrel 121 is a second thickness. The first thickness is greater than the second thickness. As shown in FIG. 1, FIG. 2 or FIG. 4, the first thickness is greater than the second thickness. That is, the flow of the coolant close to the combustion chamber of the cylinder barrel 121 is greater than the flow of the coolant in the portion away from the combustion chamber of the cylinder barrel 121, so that a greater flow of the coolant can be distributed for the combustion chamber at a higher temperature, and a relatively smaller flow of the coolant can be distributed for the portion away from the combustion chamber at a relatively lower temperature, thereby avoiding the case where most of the flow passes through the lower part of the cylinder barrel 121 without absorbing enough heat to achieve temperature lowering effects, and possibly leading to overcooling of the cylinder block 12.

In an embodiment, the engine includes an insert 19 inserted in the gap between the cylinder block 12 and the cylinder barrel 121. The third water jacket passage 13 is disposed between the insert 19 and the cylinder barrel 121. The distance between the outer wall of the portion of the cylinder barrel 121 close to the combustion chamber and the insert 19 is a first distance and the distance between the outer wall of the portion of the cylinder barrel 121 away from the combustion chamber and the insert 19 is a second distance. The first distance is greater than the second distance. That is, the insert 19 is inserted in the gap between the cylinder block 12 and the cylinder barrel 121 to provide the effect that there are different distances between the insert 19 and the cylinder barrel 121. By occupying the space by the insert 19, the portion of the third water jacket passage 13 close to the combustion chamber of the cylinder barrel 121 has a greater thickness, and the portion of the third water jacket passage 13 away from the combustion chamber of the cylinder barrel 121 has a smaller thickness. Meanwhile, the insert 19 is easily detachable, thereby avoiding the problem of increased production cost due to mold remaking for the cylinder block 12.

In an embodiment, the third water jacket passage 13 further includes a third passage 20 located between adjacent cylinder barrels 121. The third passage 20 is of a bent shape. The bent-shaped third passage 20 can increase the circulation path for the coolant so that the greatest possible amount of heat can be absorbed. The bent third passage 20 may be bent with a sharp corner, such as a V-shaped passage or the like, or bent with a round corner, such as a U-shaped passage or the like. Of course, the third passage 20 may be of a non-bent structure. For example, the third passage 20 is a passage arranged to be inclined relative to the axis of the cylinder barrel 121.

According to a second aspect of the present disclosure, a vehicle including the engine described above is provided. As the engine according to the above embodiment of the present disclosure has the technical effects described above, the vehicle according to an embodiment of the present disclosure also has the corresponding technical effects, i.e., a good cooling effect is achieved for the cylinder head of the engine.

Although some specific embodiments of the present disclosure have been described in detail by way of examples, a person skilled in the art should appreciate that the foregoing examples are merely for description and do not limit the scope of the present disclosure. A person skilled in the art should appreciate that modifications may be made to the foregoing embodiments without departing from the scope and spirit of the present disclosure. The scope of the present disclosure is defined by the appended claims.

What is claimed is:

1. An engine, comprising a cylinder head and a cylinder block, the cylinder head having a first water jacket passage, an exhaust passage, and a second water jacket passage, the exhaust passage being located between the first water jacket passage and the second water jacket passage, the first water jacket passage and the second water jacket passage being disposed close to the exhaust passage, the first water jacket passage being in communication with the second water jacket passage, the second water jacket passage being configured to be in communication with the cylinder block, and the second water jacket passage having a water inlet passage, wherein the first water jacket passage comprises a first water outlet passage located on a first side of the first water jacket passage away from the water inlet passage, and the cylinder block comprises a second water outlet passage disposed away from the water inlet passage; and wherein a coolant input at the water inlet passage of the second water jacket passage passes the second water jacket passage and is divided to flow out from the first water outlet passage of the first water jacket passage and the second water outlet passage of the cylinder block.

2. The engine according to claim 1, wherein the second water jacket passage is in communication with the first water jacket passage via multiple first passages, and the multiple first passages are distributed along an arrangement direction of cylinder barrels inside the cylinder block and close to the cylinder barrels; and the water inlet passage is located on a first side of the second water jacket passage that is opposite to a second side of the second water jacket passage in communication with the multiple first passages, and an extension direction of the water inlet passage is the same as the arrangement direction of the cylinder barrels.

3. The engine according to claim 2, wherein the second water jacket passage comprises a second water jacket primary zone, bridge zones, and a second water jacket secondary zone, the second water jacket primary zone and the second water jacket secondary zone are in communication via the bridge zones, and the second water jacket secondary zone is located on a circumference of a spark plug; and the multiple first passages are in communication with a portion of the second water jacket passage close to the bridge zones.

4. The engine according to claim 3, wherein the cylinder head further comprises a first guiding rib set and a second guiding rib set located within the second water jacket primary zone;

at least a part of the first guiding rib set is located at a first position in the second water jacket primary zone, and the first position corresponds to a region between two adjacent bridge zones; and the second guiding rib set is located at a second position in the second water jacket primary zone, and the second position corresponds to the bridge zones and is close to the bridge zones.

5. The engine according to claim 2, wherein the cylinder head further comprises a third guiding rib set located in the first water jacket passage, and the third guiding rib set causes a branch of the first water jacket passage to correspond to the exhaust passage, wherein the branch is disposed close to the exhaust passage.

6. The engine according to claim 2, wherein the cylinder block comprises a third water jacket passage surrounding outer walls of the cylinder barrels in the cylinder block, and the second water jacket passage is in communication with the third water jacket passage.

7. The engine according to claim 6, wherein the second water jacket passage is in communication with the third water jacket passage via at least one second passage, and the second passage is disposed close to the water inlet passage.

8. The engine according to claim 6, wherein a gap is formed between the cylinder block and the cylinder barrels, and the third water jacket passage is located in the gap; and the third water jacket passage on a first side close to a combustion chamber in the cylinder barrels has a first thickness, the third water jacket passage on a second side away from the combustion chamber in the cylinder barrels has a second thickness, and the first thickness is greater than the second thickness.

9. The engine according to claim 8, comprising an insert inserted in the gap between the cylinder block and the cylinder barrels, the third water jacket passage is disposed between the insert and the cylinder barrels, a distance between an outer wall of a first portion of the cylinder barrels close to the combustion chamber and the insert is a first distance, a distance between an outer wall of a second portion of the cylinder barrels away from the combustion chamber and the insert is a second distance, and the first distance is greater than the second distance.

10. The engine according to claim 6, wherein the third water jacket passage further comprises a third passage located between adjacent cylinder barrels, and the third passage has a bent shape.

11. A vehicle comprising an engine, the engine comprising a cylinder head and a cylinder block, the cylinder head having a first water jacket passage, an exhaust passage, and a second water jacket passage, the exhaust passage being located between the first water jacket passage and the second water jacket passage, the first water jacket passage and the second water jacket passage being disposed close to the exhaust passage, the first water jacket passage being in communication with the second water jacket passage, the second water jacket passage being configured to be in communication with the cylinder block, and the second water jacket passage having a water inlet passage, wherein the first water jacket passage comprises a first water outlet passage located on a first side of the first water jacket passage away from the water inlet passage, and the cylinder block comprises a second water outlet passage disposed away from the water inlet passage; and wherein a coolant input at the water inlet passage of the second water jacket passage passes the second water jacket passage and is divided to flow out from the first water outlet passage of the first water jacket passage and the second water outlet passage of the cylinder block.

12. The vehicle according to claim 11, wherein the second water jacket passage is in communication with the first water jacket passage via multiple first passages, and the multiple first passages are distributed along an arrangement direction of cylinder barrels inside the cylinder block and close to the cylinder barrels; and the water inlet passage is located on a first side of the second water jacket passage that is opposite to a second side of the second water jacket passage in communication with the multiple first passages, and an extension direction of the water inlet passage is the same as the arrangement direction of the cylinder barrels.

13. The vehicle according to claim 12, wherein the second water jacket passage comprises a second water jacket primary zone, bridge zones, and a second water jacket secondary zone, the second water jacket primary zone and the second water jacket secondary zone are in communication via the bridge zones, and the second water jacket secondary zone is located on a circumference of a spark plug; and the multiple first passages are in communication with a portion of the second water jacket passage close to the bridge zones.

14. The vehicle according to claim 13, wherein the cylinder head further comprises a first guiding rib set and a second guiding rib set located within the second water jacket primary zone;

at least a part of the first guiding rib set is located at a first position in the second water jacket primary zone, and the first position corresponds to a region between two adjacent bridge zones; and the second guiding rib set is located at a second position in the second water jacket primary zone, and the second position corresponds to the bridge zones and is close to the bridge zones.

15. The vehicle according to claim 12, wherein the cylinder head further comprises a third guiding rib set located in the first water jacket passage, and the third guiding rib set causes a branch of the first water jacket passage to correspond to the exhaust passage, wherein the branch is disposed close to the exhaust passage.

16. The vehicle according to claim 12, wherein the cylinder block comprises a third water jacket passage surrounding outer walls of the cylinder barrels in the cylinder block, and the second water jacket passage is in communication with the third water jacket passage.

17. The vehicle according to claim 16, wherein the second water jacket passage is in communication with the third water jacket passage via at least one second passage, and the second passage is disposed close to the water inlet passage.

18. The vehicle according to claim 16, wherein a gap is formed between the cylinder block and the cylinder barrels, and the third water jacket passage is located in the gap; and the third water jacket passage on a first side close to a combustion chamber in the cylinder barrels has a first thickness, the third water jacket passage on a second side away from the combustion chamber in the cylinder barrels has a second thickness, and the first thickness is greater than the second thickness.

* * * * *